United States Patent [19]

Turner

[11] Patent Number: 5,021,305
[45] Date of Patent: * Jun. 4, 1991

[54] BATTERY TERMINAL SEAL

[76] Inventor: William C. Turner, 1020 N. 23rd St., Coeur d'Alene, Id. 83814

[*] Notice: The portion of the term of this patent subsequent to Apr. 24, 2007 has been disclaimed.

[21] Appl. No.: 480,227

[22] Filed: Feb. 15, 1990

Related U.S. Application Data

[63] Continuation-in-part of Ser. No. 373,109, Jun. 28, 1989, Pat. No. 4,920,018.

[51] Int. Cl.⁵ ............................................. H01M 2/00
[52] U.S. Cl. ..................................... 429/65; 439/202; 439/522
[58] Field of Search .................. 420/65; 439/202, 522

[56] References Cited

U.S. PATENT DOCUMENTS

| | | | |
|---|---|---|---|
| 2,052,081 | 8/1936 | Campbell | 429/121 X |
| 2,623,085 | 12/1952 | Gier | 439/202 |
| 2,800,522 | 7/1957 | Coleman et al. | 429/65 |
| 2,820,208 | 1/1958 | Howells | 439/202 X |
| 3,544,953 | 12/1970 | Shannon | 439/522 |
| 3,633,154 | 1/1972 | Glantz | 439/202 |
| 3,641,480 | 2/1972 | Robin | 439/202 |
| 4,698,459 | 10/1987 | Drake | 429/65 X |
| 4,778,408 | 10/1988 | Morrison | 439/522 |
| 4,920,018 | 4/1990 | Turner | 429/65 |

Primary Examiner—Stephen J. Kalafut
Attorney, Agent, or Firm—Wells, St. John & Roberts

[57] ABSTRACT

A cover for battery terminals includes a cap arrangement that may be placed over a battery terminal and a standard cable connector to seal and protect against corrosion. In a first form, the cap includes hinged base sections and a cover section. The hinged base sections include semi-circular recesses that close about the terminal below the connector. The cover section is received over the terminal connector and upright walls of the base section. A first seal is positioned between the cap and the battery case, sealing the cap to the case. A second seal fits between the cable and the cap to complete the sealed enclosure about the terminal and connector. In a second preferred embodiment, the cap includes top and side walls with cable passages. In this embodiment, a surface is formed on the battery case for engagement with the cap to form a first seal about the terminal and connector. In yet another embodiment, a gasket seal is attached to the cap for engagement with the battery case and the cap is secured by a non-conductive fastener bolt to a threaded socket in a modified battery terminal. Cable receiving passages are provided in the walls of the base and cap. The above assemblies may be completed with the battery connector attached to the terminal post.

21 Claims, 5 Drawing Sheets

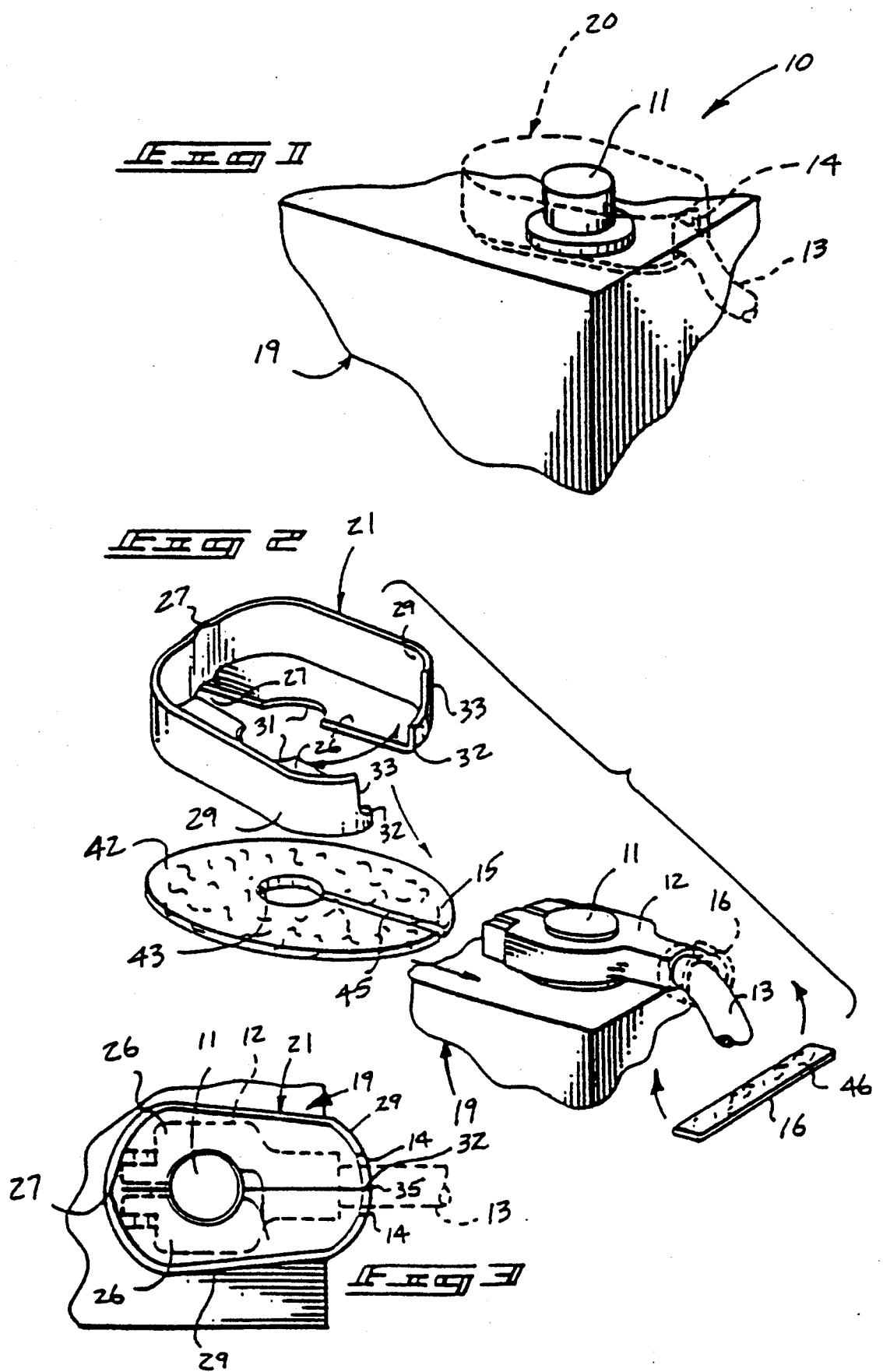

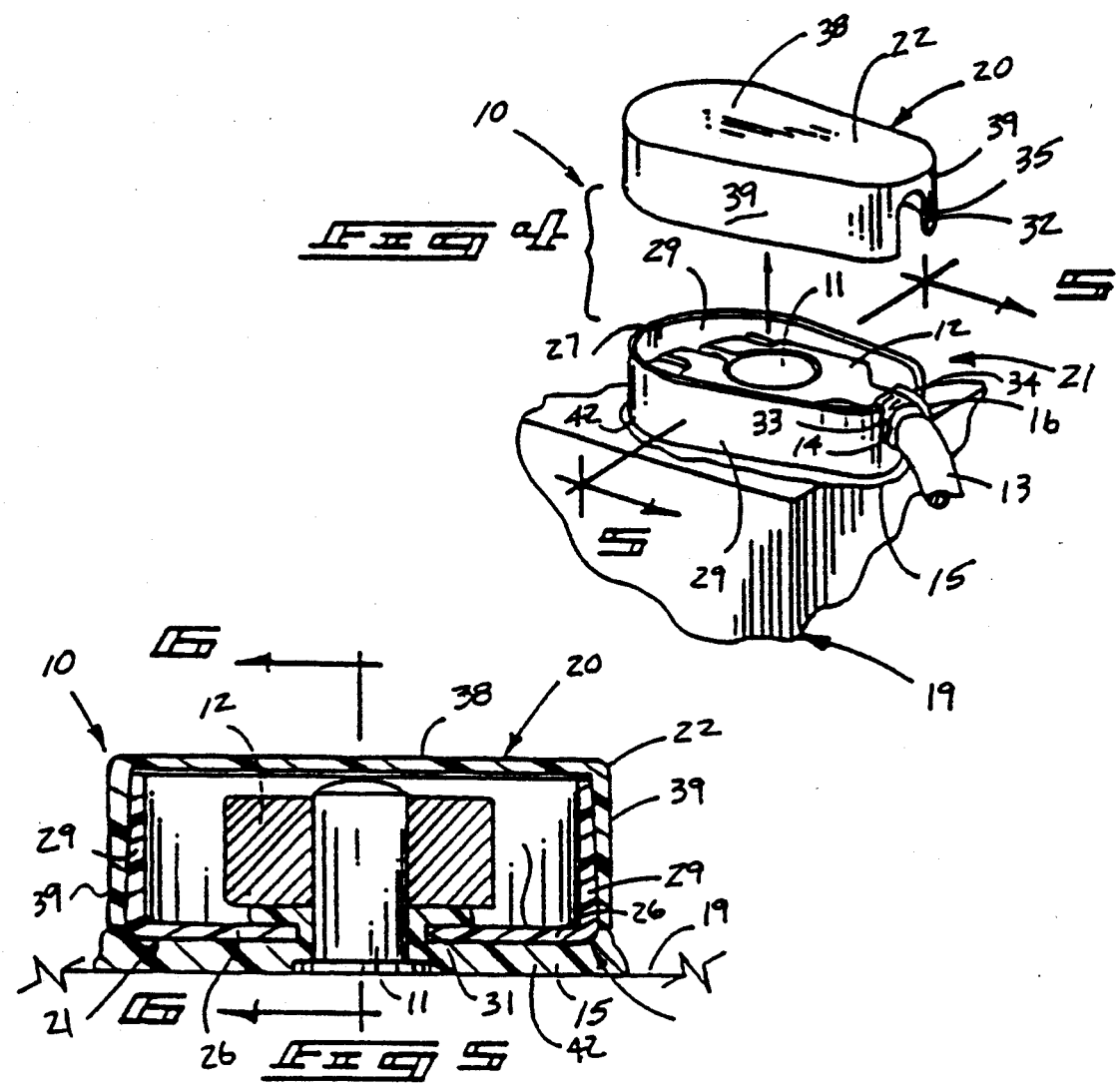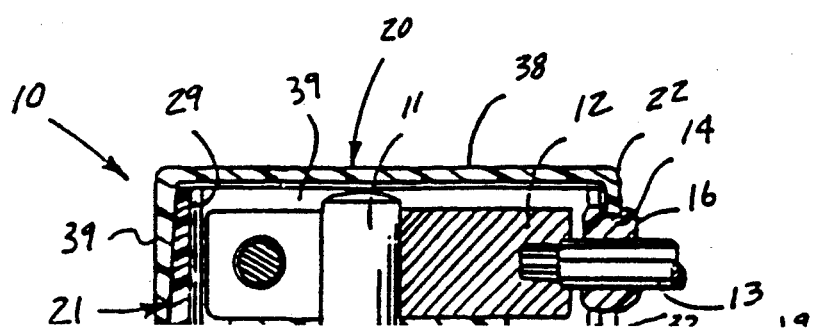

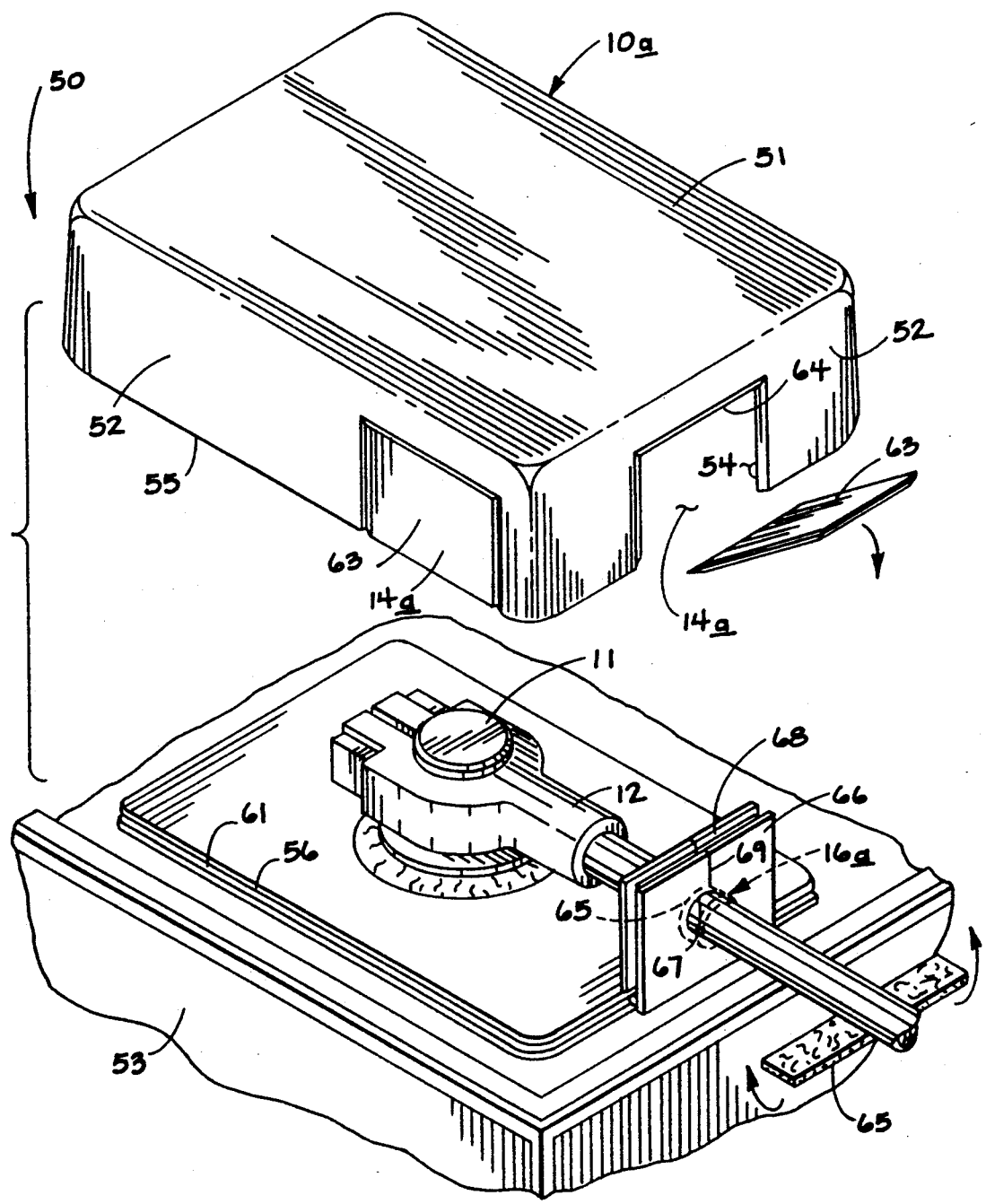

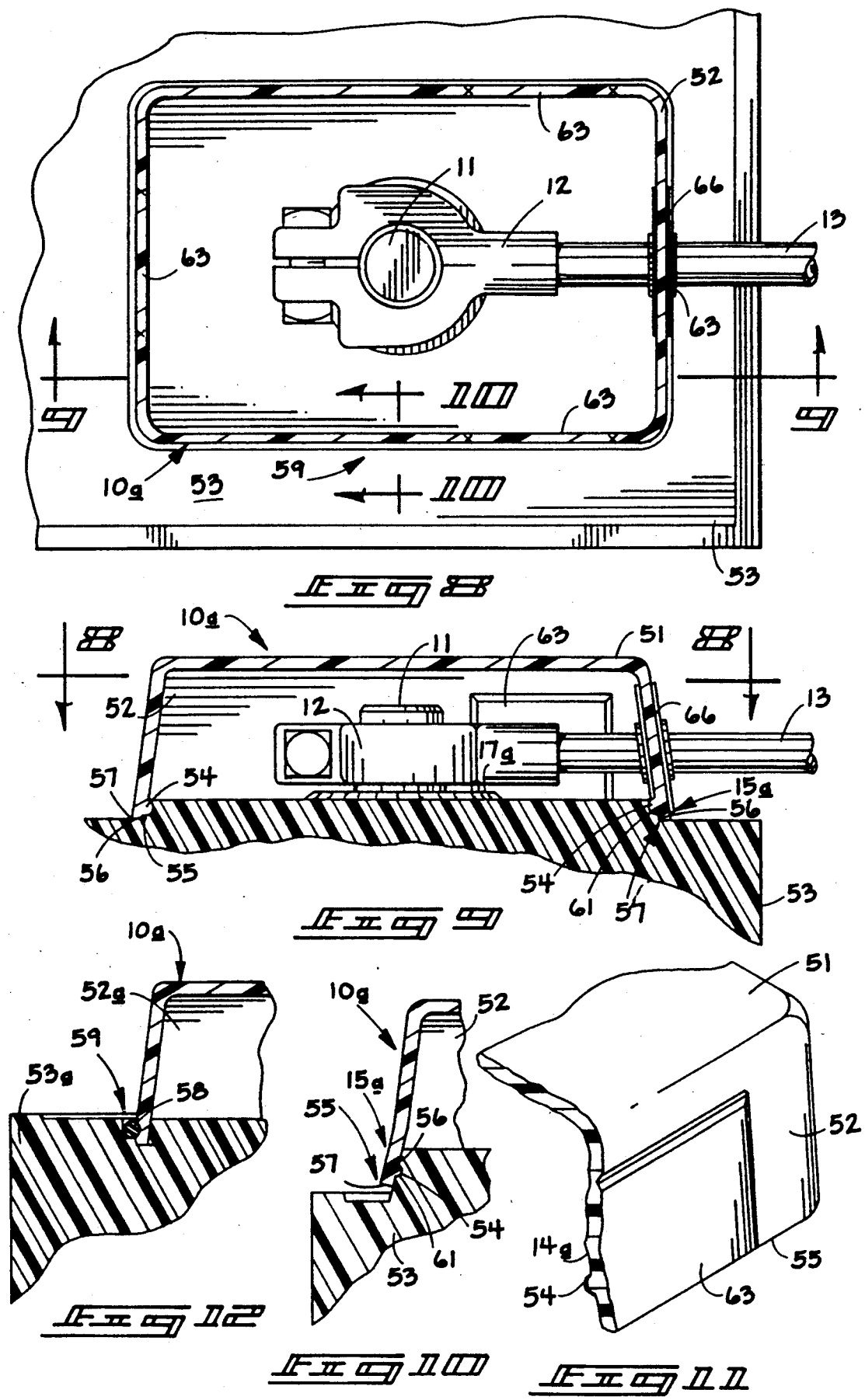

BATTERY TERMINAL SEAL

The present application is a continuation in part of co-pending U.S. patent application Ser. No. 373,109 filed on June 28, 1989 U.S. Pat. No. 4,920,018.

TECHNICAL FIELD

This invention relates to protecting and sealing battery terminals and battery cable connectors to prevent corrosion.

BACKGROUND OF THE INVENTION

Conventional vehicle battery cases are typically formed of plastic materials and include metal battery post terminals. Eventually the plastic case material weakens in the area about the terminals and no longer forms a good seal. Gases seep through the loose areas about the terminals, or through vents provided in the battery case and attack the terminals and connectors. As a result, the terminals and connectors become corroded and good electrical contact between connectors and terminals is lost.

A proven way to prevent corrosion is to hermetically isolate the contact areas between the terminals and connectors from the battery case. However, this has been a difficult task, especially as a "retrofit" with installed batteries. Covers which do form a relatively gas tight seal are expensive and difficult to install. Some such covers actually form an integral part of the battery terminal connector itself. Examples of present types of covers can be found in U.S. Pat. Nos. 2,800,522, 3,775,730 and 4,698,459.

BRIEF DESCRIPTION OF THE DRAWINGS

The preferred embodiments of the invention are illustrated in the accompanying drawings, in which:

FIG. 1 is a partial perspective view showing a battery with a terminal post, with the first preferred form of the inventive terminal cover in phantom;

FIG. 2 is an exploded view of the battery terminal post, connector and base of the first preferred terminal cover;

FIG. 3 is top plan view of the base of the first terminal cover form in place over the terminal post and with the terminal connector shown in dashed lines;

FIG. 4 is a perspective view of the base of the first preferred terminal cover placed over the terminal post with a cover section in position to be placed over the base;

FIG. 5 is an enlarged cross-sectional view, taken along line 5—5 of FIG. 4 with the cover section in place thereon;

FIG. 6 is a cross-sectional view taken along line 6—6 of FIG. 5;

FIG. 7 is an exploded perspective view of a second preferred form of the inventive terminal cover;

FIG. 8 is a sectional view taken along a plane through the second preferred cover, mounted to a battery case and enclosing a terminal and cable portion;

FIG. 9 is a sectional view of the cover and portion of a battery as seen from line 9—9 in FIG. 8;

FIG. 10 is an enlarged sectional view of a mounting assembly for the second preferred form;

FIG. 11 is a fragmentary, detail view of a knock out section of the second preferred cover portion; and FIG. 12 is a fragmented sectional view showing an alternate first seal and mounting arrangement;

DETAILED DESCRIPTION OF THE PREFERRED EMBODIMENTS

Figure 13:
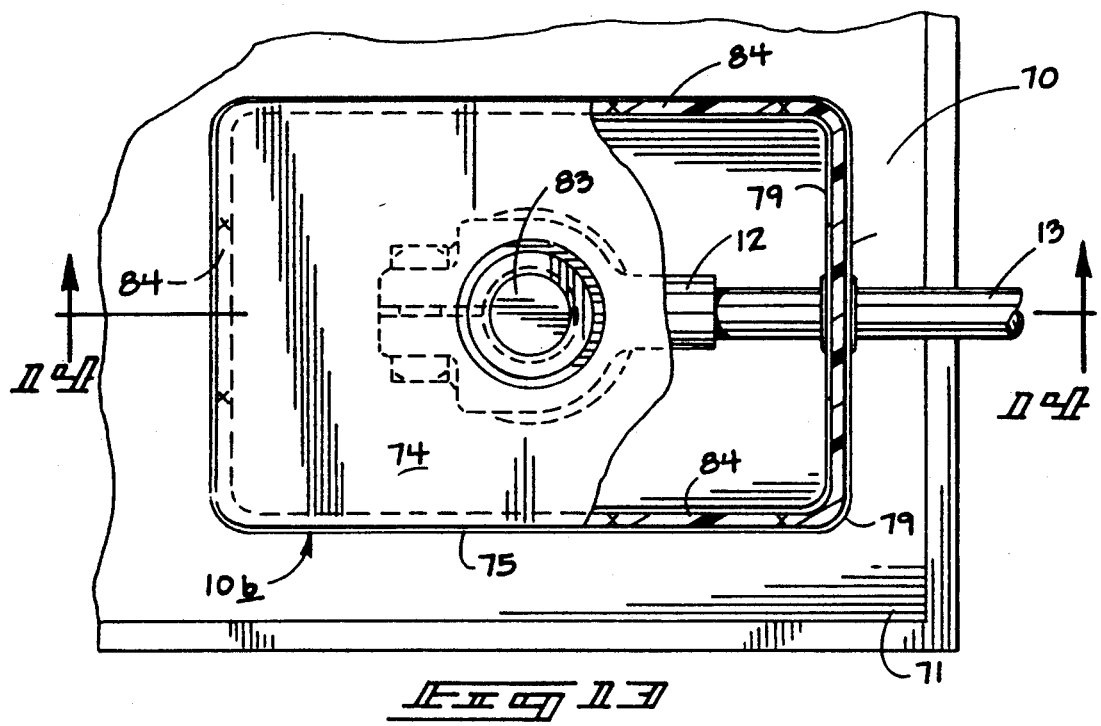
FIG. 13 is a fragmented top plan view of a third preferred cover and battery case.

The following disclosure of the invention is submitted in compliance with the constitutional purpose of the Patent Laws "to promote the progress of science and useful arts" (Article 1, Section 8).

The present invention arose out of the need for a gas tight cover for assembled battery post terminals, cable, and connectors to prevent excessive corrosion and consequential loss of good electrical contact between battery posts and connectors, and to isolate the terminals and connectors in order to avoid accidental sparking.

It is desirable that such a cover seal be inexpensive and easy to install and remove for access to the terminal posts and cable connectors. The present cover is adaptable to fit batteries with top terminal posts as well as side terminal posts, and does not require special terminal connectors, or removal of the standard terminal connectors for installation.

Three examples of preferred terminal covers are illustrated in the accompanying drawings. In general, each preferred form of the present cover includes a cap 10 for covering a battery terminal 11, an associated conventional terminal connector 12, and a portion of the attached battery cable 13. The cap 10 in all preferred forms includes one or more cable passages 14, and first and second seals 15, 16. The first seal 15 is provided to seal the cap 10 to the battery case 19. The second seal 16 is provided to seal the cable passage 14.

More specifically, the first preferred form of the present invention (FIGS. 1-6) is referred to generally by the reference numeral 20 and is intended for use with conventional batteries. In the first preferred form 20, the terminal cap 10 is basically comprised of two components: a base 21, and a cover section 22. The cover section 22 forms an enclosure with the base 21 that is adapted to receive the battery terminal 11, connector 12, and the cable portion 13.

The base 21 is comprised of pairs of elongated base plate sections 26 and intregal upright side wall sections 29. As shown in FIG. 2, the base plate sections 26 and side wall sections 29 are joined at one end by a connector means such as a hinge 27. The hinge 27 is advantageously integral with the sections 26, 29 and is formed simply as a reduction in the wall thickness. The wall thickness is preferably reduced from the inside wall surface. The external surface remains smooth and uninterrupted to enhance the sealing effect between the base 21 and cover section 22.

The base plate sections 26 and wall section 29 pivot on the upright axis of the hinge 27 from an open position as shown in FIG. 2 to a closed position as shown in FIGS. 3, 5 and 6. The hinge 27 allows the base sections 26 to rotate about an axis which is approximately parallel with the longitudinal axis of the battery terminal post 11.

Also in the first preferred embodiment, base sections 26, hinge 27, and side wall sections 29, are all molded from the same material, preferably of a flexible corrosion resistant plastic. These parts, being molded as one piece, prevent any invasion of gas through the area of hinge 27.

Base plate sections 26 include opposed semicircular recesses 31, as shown in FIG. 2. The recesses 31 are adapted to form an opening to fit around terminal post 11 when the base 21 is in its closed position, as shown in FIGS. 3, 5 and 6.

The side wall sections 29 terminate at end edges 32 (FIG. 2) that are opposite to the hinge 27. The end edges 32 abut when the base 21 is in its closed position, as is shown in FIG. 3. The end edges 32 include opposing recesses 33 which together with a complimentary recess 35 in the cover section 22 define the cable passage 14 through which the battery cable 13 passes, as shown in FIG. 4.

The first preferred embodiment cover section 22, is exemplified by FIGS. 4-6. The cover section 22 includes a top wall 38 and integral cover side walls 39 which extend around the periphery of the top wall 38. Cover side walls 39 interfit with the base side wall sections 29 when closed.

The top wall 38 and side walls 39 are formed from one piece of material, such as the same plastic used to form the base 21. The wall 39 is sized to slidably fit over and seal with the outward surfaces of the base wall sections 29. The side wall 39 will thus hold the base wall sections 29 in their closed condition.

The first and second seals 15, 16 of the first embodiment cover 20 are preferably formed of a gas and acid impervious moldable putty material. It has been found that a putty-like caulk sold under the trademark "PERMAGUM" by Inmont Corp. at 1218 Central Ind. Drive, St. Louis, Mo. 63110, includes desirable properties for the seals.

The first seal 15 is shaped as a flat washer 42, formed of the seal material and including a central hole 43 (FIG. 2) for receiving a terminal post 11. A slit 45 advantageously extends from hole 43 to the seal perimeter to allow the seal to be fitted around the terminal 11 under the conventional connector 12 without having to remove the connector from the terminal.

The second seal 16 is provided in a relatively thin sheet 46 (FIG. 2), and is shaped to be wrapped around the battery cable 13 and pressed into the cable passage formed by recesses 34, 35 (FIGS. 4, 6).

To install cover 20, the flat washer seal 42 is first positioned about the terminal 11, under the conventional connector 12 and against the battery case surface. The base 21 is then positioned and closed about the terminal 11 above the flat washer seal 42, with the base plate sections 26 fitting beneath the connector 12. The terminal 11 extends through the terminal opening formed by the recesses 31. The base sections 26 are then pressed downwardly against the washer seal 42. The above steps may be accomplished without having to remove the conventional cable connector 12 from the terminal 11.

Compressive forces are then applied against the first seal by pressing the base 21 firmly against the battery to deform the washer seal 42 and provide suitable seal between each of the base 21, terminal 11, and battery case 19.

The cover section 22 can next be fitted over the base 21. As can be seen from FIGS. 5 and 6, the cover side walls 39 are shaped so the cover section fits over and seals against the base side walls 29. The side walls 29, 39 thus become a portion of the first seal 15.

Battery cable 13 now passes through the passage 14 formed by the joined cover section and recesses 35, 34. The thin sheet 46, forming the second seal 16 is now placed to fill the space between the cable 13 and the adjacent surfaces of the base 21 and cover sections 22. A hermetic seal is thus formed about the terminal 11, connector 12, and the cable portion 13 so air and gases cannot reach the terminal post 11 or connector 12. Corrosion is thus avoided.

While the description has been directed to an embodiment of the invention for use with a battery having conventional top terminal posts, the described structure can also be used with batteries having side terminals. In either case, the cover can be quickly and easily mounted without requiring disassembly of the connectors from the terminals. The cover will remain sealed until it is desired to access the terminals, at which time the cover section may simply be removed. Also, if desired, the base sections can be separated to fully expose the connectors.

The second preferred embodiment 50 of the inventive cover is exemplified in FIGS. 7-12 in combination with a battery case 53.

The second embodiment cover 50 includes a modified cap 10a and battery case 53. The modified version of cap 10a includes an integrated top wall 51 and peripheral side walls 52. The side walls 52 extend downwardly to bottom edge surfaces 55 that are received by a complimentary raised integral receiving surface 56 of the battery case 53. Engaged portions of surfaces 55 and 56 define the first seal 15a.

Seal 15a is formed primarily along a seal area 57 between the bottom inside surface of side walls 52, and the complimentary raised receiving surface 56 on the battery case 53. The seal area 57 encircles the terminal 11 and conventional connector 12.

The seal areas include a bead 54 (FIG. 10) advantageously incorporated along the interior periphery of side walls 52. The bead 54 may be snapped into a complimentary perimetral groove 61, formed in the receiving surface 56. The bead 54 and groove 61 assist the sealing function between the two engaged surfaces and serve as a latching mechanism 59 to hold the cover in place on the battery. This variation could also incorporate an O-ring seal (not shown) in place of the bead 54 along either of the interfitting parts of the receiving surface 56 or cap side walls 52.

Alternatively, an O-ring 58 (FIG. 12) may be used as the receiving surface. The "O" ring 58 seats firmly against the inside surface of the cap side walls 52a, thereby functioning as the first seal 15a between the battery and cap.

In both of the above second form configurations, the side wall bottom edges and the bead 54 or "O" ring 58 at the joint of the battery case surface and cap comprise a first seal 15a (FIGS. 9, 10). The cap 10a and the area of battery case 53 spanned by the cap form a relatively air tight enclosure about the terminal. The air tight enclosure is further secured by an auxiliary seal 17a formed about the juncture of the terminal 11 and the battery case 53. The seal 17a is advantageously formed of the "Permagum" material referred to above.

It is noted that the second embodiment cap may be constructed of the same plastic material as that discussed for the first embodiment. Wall thickness is selected so the side walls 52 flex to facilitate engagement and disengagement of the cap 10a with the receiving surface 56.

Potential cable passages 14a on the cap 10a each include a knockout section 63 (FIG. 7, 11). The knockout sections 63 are formed by scored sections of the side walls 52, each being selectively removable from the cap to leave a cable receiving recess 64 (FIG. 7) at a selected position on the cap. FIG. 7 indicates one of the knockout sections 63 removed from the side wall. The score lines do not completely penetrate the side walls in order to maintain an airtight enclosure. The positions for the knockout section 63 are selected to accommodate different angular orientations of the battery terminal connector 12 and cable 13.

A removed knockout section 63 leaves a cable receiving recess 64 at the selected position on the cap side wall 52 as shown in FIG. 7. This recess 64 is shaped to slidably receive a cable receiving insert 66. The insert 66 includes a hole or opening 67 therein for receiving and encircling the battery cable 13. A slit 69 extends from a peripheral edge 68 of the insert 66 to the hole 67. The slit 69 facilitates mounting of the insert 66 on the battery cable simply by flexing the walls of the insert 66 in opposite directions and slipping the separated surfaces of the slit over the cable. Resiliency of the insert material (being the same as that of the side walls 52) allows the insert 66 to return to its original configuration, capturing the cable within the hole 67.

The insert 66 includes a grooved peripheral edge 68 that is shaped to receive and overlap surfaces of the side wall 52 adjacent the cable receiving recess 64. The grooved edge 68 is intended to fit firmly over the side wall 52 (FIGS. 8, 9) to substantially seal the insert 66 against the side wall 52.

The insert 66 and a strip of sealing material 65 (FIG. 7) identical to the strip discussed above in conjunction with the first embodiment, may be used to complete the second seal 16a between the side wall 52 and battery cable 13. The sealing material may be applied in the same manner described above.

It is noted that installation of the second embodiment cover 50 may be accomplished, as the first embodiment, with the connector 12 mounted to the battery terminal 11. Assembly is accomplished simply by firstly attaching the insert 66 about cable 13 and sliding it into place substantially as shown in FIG. 7. Of course, the insert 66 would be positioned elsewhere if the angular orientation of the cable is to be different than shown.

Next, the appropriate knockout section 63 is removed from the side walls 52. The cap is then secured to the battery case with the cable receiving recess 64 filled by the insert 66, and with the second seal material 65 applied between the cable and the insert 66. The bottom edge surface 55 is firmly secured against the edge receiving surface 56 to complete the first seal 15. The bead 54 snaps into engagement within the complimentary recess 61 as the cap is pressed downwardly. The recess 61 and the bead 54 releasably hold and seal the surfaces 55, 56 firmly together. The terminal 11 and conventional connector 12 are thereby effectively sealed within the cap.

The cap may be removed simply by prying the side walls 52 upwardly to snap the bead 54 from recess 61. The cap may then be pulled upwardly away from the terminal 11 and connector 12. The insert 66 will remain on the cable 13.

Figure 14:
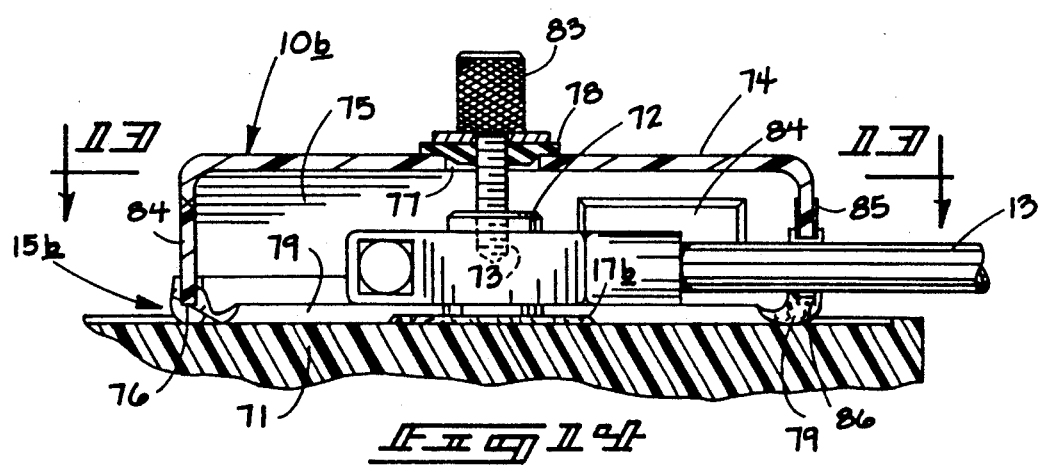
FIG. 14 is a sectional view taken along line 14—14 in FIG. 13.
Figure 15:
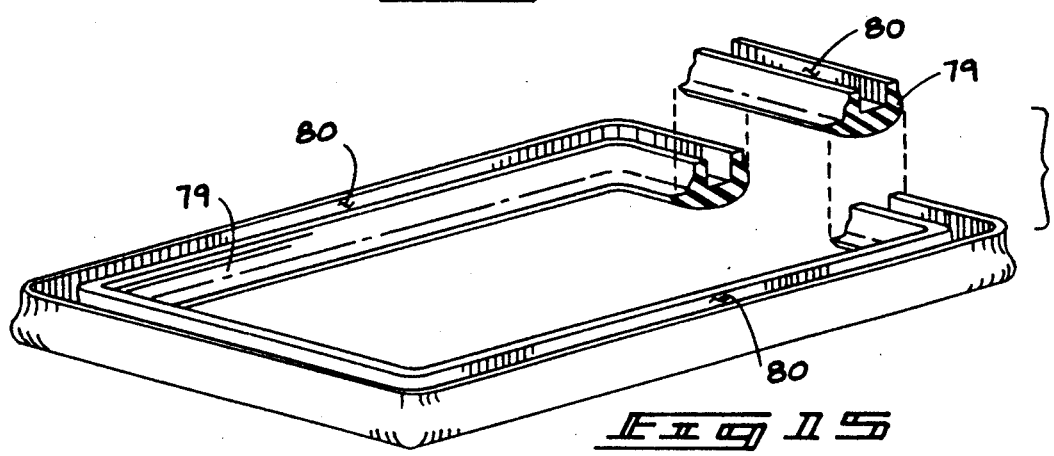
FIG. 15 is a detail perspective view of a seal for the third preferred form.

The third preferred embodiment 70 of the inventive cover is exemplified in FIGS. 13–15. It is usable with a battery case 71 having a modified battery terminal 72. Modified battery terminal 72 includes an upwardly facing socket 73 (FIG. 14). The socket 73 is used, as will be understood below, to hold the third embodiment cap 10b in place on the battery and to secure a first seal 15b.

The cap 10b of the third embodiment includes a cover top 74 and peripheral side walls 75 extending downwardly to a peripheral bottom edge 76.

The first seal 15b, includes a gasket seal 79 mounted to the cap to encircle the terminal and connector for peripheral sealing engagement between the cap and the battery case 71. An auxiliary seal 17b may also be provided, substantially identical to the seal 17a described above.

The gasket seal 79 (shown sectioned in FIG. 14 and alone in FIG. 15) includes a groove 80 for receiving the side wall bottom edge 76. The material forming the gasket seal 79 is preferably an appropriate gasket material such as a blended neoprene or other resilient, air impervious and acid resistant rubber or plastic material.

A hold down fastener such as a non-conductive screw 83 is provided on the top wall 74. The screw 83 is selectively engageable with the socket 73 on the terminal in order to hold the cap with the gasket seal 79 in firm, airtight sealing contact with the battery case 71. The shank of screw 83 may be fitted through an enlarged hole 77 in the top wall 74. The hole 77 is considerably larger in diameter than the screw 83 in order to allow limited adjustable positioning of the third embodiment cover 70 on the battery case 71. An oversized washer gasket 78 fits over the screw shank and abuts the top wall 74 spanning the hole 77. As the screw is turned into the threaded socket 73, the washer 78 is pressed against the top wall 74 and the gasket seal 79 is clamped downwardly against the engaged surface of the battery case, forming the first seal 15b.

The third embodiment may incorporate knockouts 84 that are substantially identical to the knockout section 63 of the second embodiment. An insert 85 (FIG. 14) is provided that is substantially similar to the described insert 66 of the second embodiment, with the exception that insert 85 includes a bottom edge 86 for mounting the seal gasket as shown in FIG. 14. The insert 85 is assembled with the side wall 75 in essentially the same manner as described for the second embodiment 50.

Installation of the third embodiment follows similar procedures to that described for the second embodiment, with the exception that the cap 10b is secured to the battery by operation of the screw 83 in threaded engagement with the socket 73 on the terminal 72. Removal is accomplished simply by loosening the fastener 83 and pulling the cap upwardly from engagement with the battery case. The insert 85 will simply slip from engagement with the adjacent side wall 75, thus exposing the terminal 72 and the connector 12.

It should be noted that various features of the three example embodiments shown may be interchanged. For example the knockouts of the second and third embodiments could be used in the base and cover section side walls of the first preferred embodiment. Other substitutions could also be made of the various features shown.

In compliance with the statute, the invention has been described in language more or less specific as to structural features. It is to be understood, however, that the invention is not limited to the specific features shown and described, since the means and construction herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A battery case terminal, cable, and connector seal assembly, comprising:
   a cap including a top and a side wall extending about the periphery of the top, the cap forming an enclosure to releasably receive the battery terminal, connector and a portion of the cable;
   the side wall including a cable passage for receiving the cable;
   a first seal for substantially sealing the cap side wall and the battery case about the terminal and the connector; and
   a second seal for sealing the cable passage about the battery cable.

2. The battery case terminal, cable, and connector seal assembly of claim 1 wherein the first seal is comprised of a bottom edge surface on the cap side wall and a complimentary edge receiving surface formed in the battery case about the terminal and the connector.

3. The battery case terminal, cable, and connector seal assembly of claim 2 wherein the edge receiving surface and the cap side wall include a latching mechanism operable to releasably secure the cap to the battery case.

4. The battery case terminal, cable, and connector seal assembly of claim 2 wherein the battery terminal includes a socket;
   wherein the first seal includes a gasket seal mounted to the cap for encircling the terminal and connector and for peripheral sealing engagement between the cap and battery case; and
   a hold down fastener on the cap, selectively engagable with the socket on the terminal to hold the cap with the gasket seal in sealing contact with the battery case.

5. The battery case terminal, cable, and connector seal assembly of claim 1 wherein the first seal includes a gasket seal for encircling the terminal and connector for peripheral sealing engagement between the cap edge surface and battery case.

6. The battery case terminal, cable, and connector seal assembly of claim 1 wherein the cap includes a plurality of knock out sections positioned about the side wall, each knock out section being selectively removable from the cap to provide a cable receiving recess at a selected position in the cap.

7. The battery case terminal, cable, and connector seal assembly of claim 6 further comprising: a cable receiving insert with an opening therein for receiving the second seal and encircling the battery cable; and
   wherein the insert includes a peripheral edge shaped to be received by the cable receiving recess formed by removal of one of the knock out sections.

8. The battery case terminal, cable, and connector seal assembly of claim 1 further comprising:
   a pair of base sections each including a terminal receiving recess therein;
   connector means joining the base sections for movement between open positions wherein the base sections are separated and closed positions wherein the base sections are positioned adjacent one another with the terminal receiving recesses forming a terminal receiving opening;
   a cover section receivable over the base plate and sized to cover the battery terminal;
   wherein the side wall extends between the cover section and base plate, forming an enclosure with the base plate and cover section, the enclosure being adapted to receive a battery terminal and connector; and
   wherein the first seal is flexible and shaped to substantially seal the base sections at the terminal receiving opening about the terminal.

9. The cover of claim 8 wherein the connector means is comprised of a hinge joining the base sections for pivotal movement between the open and closed positions.

10. The battery case terminal, cable, and connector seal assembly of claim 9 wherein the side wall is integral with the base sections and wherein the hinge joins the base sections at the side wall.

11. The battery case terminal, cable, and connector seal assembly of claim 9 wherein the base sections and side wall are integral and formed of plastic and wherein the hinge is integral with the side wall.

12. The battery case terminal, cable, and connector seal assembly of claim 8 wherein the first seal is formed in the shape of a flat washer with a central hole for receiving the battery terminal, and is positionable between the base sections and battery case to deform against the base sections and terminal to fill and seal the terminal opening upon compressive forces being applied against the first seal by the base sections.

13. The battery case terminal, cable, and connector seal assembly of claim 8 wherein the first seal is comprised of a moldable acid resistant adhesive putty material.

14. The battery case terminal, cable, and connector seal assembly of claim 8 wherein the first and second seals are formed of a moldable acid resistant adhesive putty.

15. The battery case terminal, cable, and connector seal assembly of claim 8 wherein the first seal is formed in the shape of a flat washer with a central hole for receiving the battery terminal, and is positionable between the base sections and battery case to deform against the base sections and terminal, to fill and seal the terminal opening upon compressive forces being applied against the first seal by the base sections.

16. The battery case terminal, cable, and connector seal assembly of claim 8 wherein the connector means is comprised of a hinge joining the base sections for pivotal movement between open and closed positions.

17. The battery case terminal, cable, and connector seal assembly of claim 16 wherein the side wall is integral with the base sections and wherein the hinge joins the base sections at the side wall.

18. The battery case terminal, cable, and connector seal assembly of claim 8 wherein two engaging side walls are provided, one being on the base and one being on the cover section, the two side walls being received in an overlapping relationship and forming part of the first seal.

19. The battery case terminal, cable, and connector seal assembly of claim 8 wherein the connector is comprised of a hinge joining the base sections and wherein side wall is comprised of:
   a cover section wall;
   a base section wall integral with the base, the hinge being integral with the base section wall;
   wherein the cover section wall and base wall section slidably interfit, forming a substantially airtight seal; and wherein the hinge is integral with the cover section wall.

20. The battery case terminal, cable, and connector seal assembly of claim 19 wherein the cover section wall fits over the base sections wall to the outside thereof.

21. The battery case terminal, cable, and connector seal assembly of claim 20 wherein the cable passage is defined by opposed recesses formed in the cover section wall and base section wall.

* * * * *